UNITED STATES PATENT OFFICE.

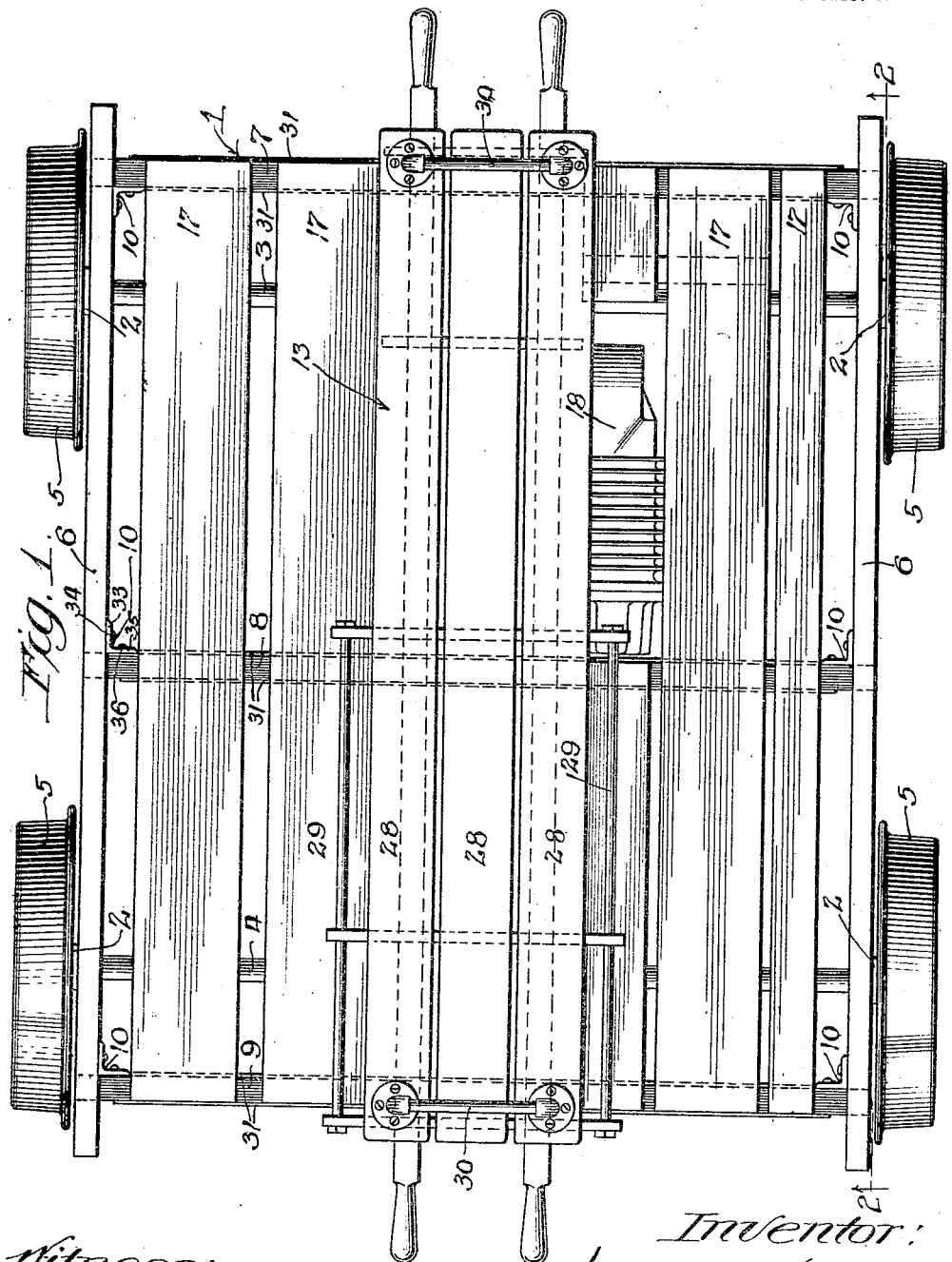

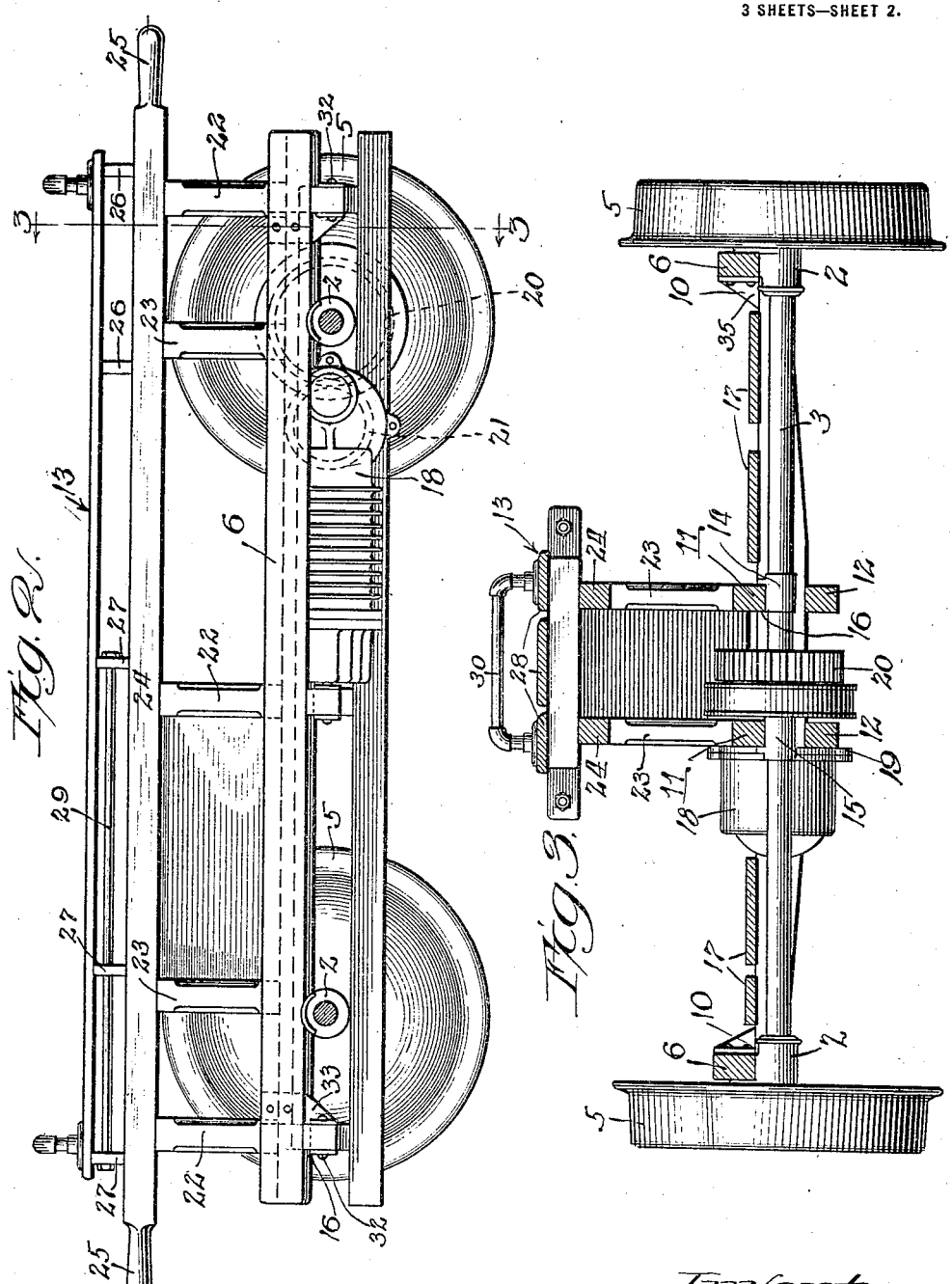

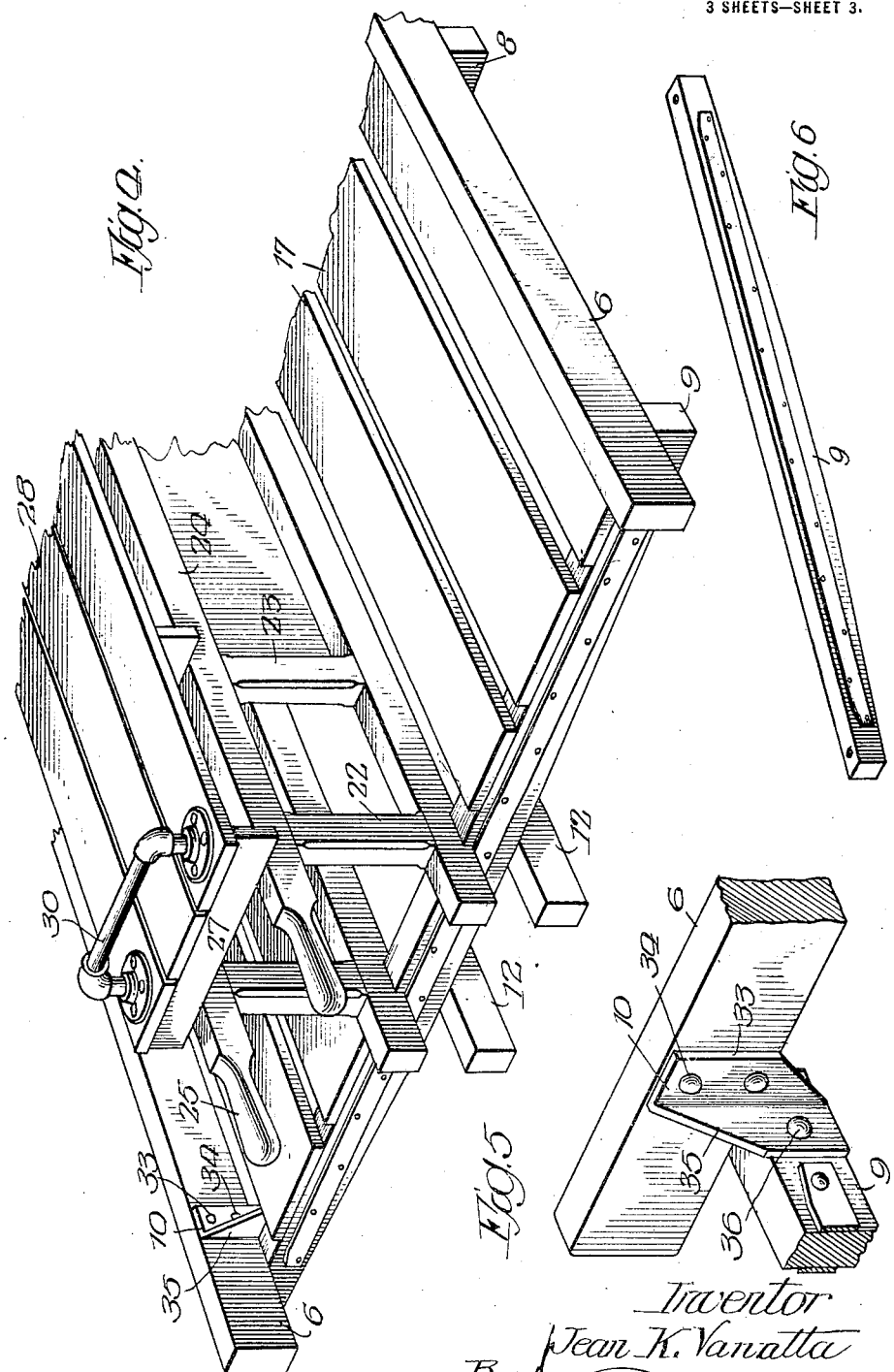

JEAN K. VANATTA, OF CHICAGO, ILLINOIS, ASSIGNOR TO MUDGE & COMPANY, OF CHICAGO, ILLINOIS, A CORPORATION OF ILLINOIS.

MOTOR-CAR.

1,285,847.  Specification of Letters Patent.  Patented Nov. 26, 1918.

Application filed April 8, 1918. Serial No. 227,170.

*To all whom it may concern:*

Be it known that I, JEAN K. VANATTA, a citizen of the United States, and a resident of Chicago, in the county of Cook and State of Illinois, have invented certain new and useful Improvements in Motor-Cars; and I do hereby declare that the following is a full, clear, and exact description thereof, reference being had to the accompanying drawings, and to the letters of reference marked thereon, which form a part of this specification.

My invention relates to improvements in motor cars especially designed for use on railways in place of the old style hand-cars.

Among the many objects of my invention are to provide a car which shall be as light in weight as consistent with the rough usage to which such cars are subject; to lower the cost and increase the rigidity of such cars; to provide a car of this character which will better fulfil the functions, which shall be more durable, and which shall be more easily kept in repair than has hitherto been possible. In other words, it is my object to provide a construction which is extremely simple, in which the several parts are standardized as to dimensions, and which is such that strength and rigidity is at a maximum for the amount of material involved.

Other and further objects of my invention will appear hereinafter.

My invention resides in a motor car for use on railways involving the various features of construction and several combinations and relations of parts whereby I am enabled to attain the above mentioned and other objects and all as hereinafter described and particularly pointed out in the appended claims.

My invention will be more readily understood by reference to the accompanying drawings forming part of this specification and in which:—

Figure 1 is a top plan view of a motor driven railway car embodying my invention in one, a preferred form;

Fig. 2 is a vertical longitudinal section of the car on the line 2—2 of Fig. 1; and Fig. 3 is a vertical transverse sectional view of the car on the line 3—3 of Fig. 2.

Fig. 4 is a perspective view of a portion of the car, showing more clearly the construction of the longitudinal trusses and the cross bar in truss form.

Fig. 5 is a perspective view of the corner bracket in proper position.

Fig. 6 is a perspective view of one of the cross bars.

It is my special object to provide a car of the character described which shall be conveniently arranged both for operation and for removal from and replacement upon the track, in which the normal load shall be centrally distributed and which shall be provided with the maximum storage platform space for tools, etc., consistent with the dimensions permissible for such cars.

I provide my car, as illustrated in the drawings, with a main platform or bed 1 which is carried upon boxes 2, which in turn provide bearings for the axles 3 and 4. The axles are arranged transversely of the platform, one adjacent to each end of the car, and are provided on their ends with flanged car wheels 5 which are rigidly mounted on the axles. These car wheels, as I arrange them, are of uniform dimensions, that is, they are all of one diameter and duplicates of each other, which not only reduces the cost in production, but also aids in reducing the required repair parts which it is necessary to distribute along the railway to keep these cars in repair.

The platform 1 of my improved car consists of relatively light weight wooden side bars 6 which rest on and are secured to the several boxes 2 and serve to space the axles apart, and a number of similar cross-bars 7, 8 and 9 which extend across the platform, their ends projecting beneath the side bars 6, and joined at their ends to said side bars by means of angle brackets 10.

Adjacent to the transverse middle portion of the platform I provide two light longitudinal trusses, each comprising an upper wooden bar 11 and a lower wooden bar 12, and I space these trusses apart a sufficient distance to serve as a suitable foundation for an elevated seat 13, which I provide for the operator. The bars 11 and 12 are spaced vertically by the several cross-bars 7, 8 and 9 to which they are suitably rigidly connected, and I provide for the axle 3 bearings 14 and 15 which are carried by the upper longitudinal bars 11. Preferably I form the cross-bars 7, 8 and 9 in truss form, as shown, the middle portion being deeper than their ends, for the purpose of adding strength and making the structure light in weight.

As arranged, the upper surfaces of the cross-bars are substantially level with the lower edges of the side bars 6 and consequently these side bars 6 form side guards for the platform 1.

The center bars 11 are arranged above the cross-bars, and I preferably notch these center bars to receive the cross-bars, thus producing a connection, shown at 16, between the cross-bars and the center bars, which is adapted to withstand the thrust of end shocks on the car.

Between the center bars 11 and the side bars 6 I complete the platform 1 by means of floor boards 17 which extend over and are suitably fastened to the cross-bars. Preferably I space these boards apart for lightness. I cut away one of the floor boards of the platform 1 to make room for an engine 18 which I secure to one of the center trusses by means of suitable flanges 19, the trussed center bar forming a suitable rigid foundation for the engine and yet one, on account of its position substantially midway between the wheels, which is not subject to the direct shock of the wheel impact on the rails in the manner that it would be if placed immediately above the wheels as in the old style of car.

Between the center trusses I provide a gear 20 on the axle 3, which is adapted to mesh with a pinion 21 carried by the engine and is adapted to drive the car through power developed by the engine.

For supporting the seat 13 at a suitable height, to provide leg room for the operator, I provide posts 22 rising from the center bars 11 and arranged above the several cross-bars, and posts 23 which also rise from the center bars substantially above the axles 3 and 4. Upon these two lines of posts I arrange longitudinal wooden bars 24 suitably secured to the posts, and I extend these bars 24 at their ends beyond the ends of the platform and form their projecting ends into handles 25. These handles being substantially centrally arranged as to the weight of the car are best positioned for lifting the car for removal from and replacement upon the track.

Upon these bars 24 I arrange and secure a number of cross-bars 26 and 27 upon which I secure the seat proper comprising three boards 28 extending the length of the car and spaced slightly apart to provide a certain degree of resiliency to the seat. The cross-bars 27 are longer than the width of the seat, and I secure hand rods or rails 29 near their outer ends parallel with the seat and adapted to be grasped by the hands of the operator to hold himself on the car.

To provide end guards and to strengthen the seat, I provide light tubular guards 30 secured to the outer of the three seat boards at their ends and rising a few inches above the seat proper. These guards also constitute handle grips either for holding on or for assisting in lifting the car.

For the purpose of strengthening cross-bars 7, 8 and 9 I preferably provide thin metallic plates 31 substantially as long as these cross-bars and one for each side of each bar. These plates are solidly secured to the bars by rivets 32. This composite construction of cross-bars in trussed form, as shown, provides a structure which gives a maximum of strength with a minimum of weight.

The angle brackets 10 by which the cross-bars are secured to the side bars 6 are of peculiar construction. One flange 33 thereof is secured by rivets 34 to the side bars, and the flange 35 is secured by rivets 36 to the cross-bars. The flange 35, as shown in Fig. 3, is cut off on an angle from the upper edge of the side bar 6 to the upper edge of the cross bar to which it is secured, and the flange 33 is cut off on an angle, as shown in Fig. 2, from the lower edge of the cross-bar up to the lower edge of the side bar, thus providing an angle bracket connection between these bars which are in different planes and which connection is a very strong one in relation to its weight.

The platform 1 as described is of maximum width in relation to the gage of the track upon which the car is adapted to be operated, that is, it is as wide as possible between the flanges of the wheels 5. Being constructed mainly of wood, the platform is exceedingly rigid as regards any shock or strains to which it is subject in use and is yet more resilient in reference to road shocks than if made entirely of metal. Furthermore the placement of the engine 18 and the seat 13 transversely in the middle of the car provides a car in which the normal load is not subject to the direct impact shock of the wheels upon the rails, but in which, on the other hand, the resiliency of the platform is effective to reduce the transmission of these road shocks to the operator and the engine.

All of these advantages which accrue from my improved construction, result in lessening the cost and increasing the durability and the convenience of operation of the car.

As many modifications of my invention will readily suggest themselves to one skilled in the art, I do not limit or confine my invention to the specific structures herein shown and described, except within the scope of the appended claims.

I claim:

1. The improvements herein described comprising a motor car for use on railways and having two axles with flanged wheels at their ends, a platform of maximum width arranged between the wheels and having side bars, bearings carried by the side bars for said axles, cross-bars arranged beneath the side bars and rigidly connected at their ends thereto, centrally arranged longitudinal bars connecting the cross-bars, an engine mounted on one of said center bars and geared to one of the axles, and an elevated seat centrally arranged on said platform substantially above the engine.

2. In a railway motor car, a skeleton wooden platform comprising side bars adapted to rest adjacent to their ends upon the axles of the car, cross-bars extending beneath the side bars and hung thereto by angle brackets, longitudinally extending centrally trussed bars, each comprising upper and lower bars arranged in the middle portion of said platform, an engine secured to one of said trusses and geared to one of said axles, a seat supported on said trusses above the level of said platform and substantially above said engine whereby said engine and said seat are not subject to the direct impact of the wheels upon the rails.

3. In a car of the class described, a skeleton wooden platform comprising side bars and cross-bars, the side bars carrying bearings adjacent to their ends for the axles of the car, the cross-bars hung at their ends from the side bars by angle brackets, metallic plates secured to the side faces of the cross-bars, and an engine and an operator's seat arranged on the middle portion of the platform transversely between the side bars.

4. In a car of the class described, a platform supported on the axles of the car between the wheels thereof and comprising side bars, cross-bars arranged beneath the side bars and connected thereto, each connection between a cross-bar and a side bar comprising an angle bracket having one flange secured to a side bar and the other flange secured to a cross-bar, the second flange cut off on an angle from the top of the side bar to the top of the cross-bar, and the first flange cut off at an angle from the bottom of the cross-bar to the bottom of the side bar, substantially as and for the purpose described.

In testimony, that I, claim the foregoing as my invention I affix my signature in the presence of two witnesses, this 4th day of April, A. D. 1918.

JEAN K. VANATTA.

Witnesses:
TAYLOR E. BROWN,
BERTHA L. MACGREGOR.

Copies of this patent may be obtained for five cents each, by addressing the "Commissioner of Patents, Washington, D. C."